United States Patent [19]
Dowell

[11] 3,892,293
[45] July 1, 1975

[54] DISC BRAKES

[75] Inventor: Frederick Sidney Dowell, Coventry, England

[73] Assignee: Dunlop Limited, England

[22] Filed: Dec. 18, 1973

[21] Appl. No.: 425,854

[30] Foreign Application Priority Data
Dec. 21, 1972 United Kingdom............ 59246/72

[52] U.S. Cl.......... 188/71.5; 188/73.2; 188/251 A; 192/107 M
[51] Int. Cl............................................ F16d 55/36
[58] Field of Search............ 188/71.5, 72.3, 251 R, 188/251 A, 251 M, 73.2; 192/107 M, 70.14

[56] References Cited
UNITED STATES PATENTS

| | | | |
|---|---|---|---|
| 3,171,522 | 3/1965 | Petrie et al. | 188/71.5 |
| 3,650,357 | 3/1972 | Nelson et al. | 188/71.5 |
| 3,692,150 | 9/1972 | Ruppe, Jr. | 188/71.5 |
| 3,695,406 | 10/1972 | Graham et al. | 188/72.3 |
| 3,800,392 | 4/1974 | Cook et al. | 188/218 X L |

Primary Examiner—Trygve M. Blix
Assistant Examiner—Edward R. Kazenske
Attorney, Agent, or Firm—Stevens, Davis, Miller & Mosher

[57] ABSTRACT

An aircraft disc brake has a pack of interleaved annular rotor and stator discs, the former keyed at their outer peripheries to the wheel and the latter keyed at their inner peripheries to a torque tube. To reduce oxidation of the hot discs, which are made of reinforced carbon, the free spaces between the keyed peripheries of adjacent stator discs, or both stator and rotor discs, are occupied by filler elements formed separately from the discs and either secured to the latter or disposed loosely in the free spaces between keys of the wheel or torque tube.

8 Claims, 9 Drawing Figures

DISC BRAKES

This invention relates to multi-plate disc brakes comprising a number of annular non-rotatable or stator discs interleaved with a number of annular rotatable or rotor discs and a brake-applying mechanism arranged to axially displace the rotor and stator discs into frictional engagement.

When such discs brakes are employed to brake an aircraft wheel, the stator discs are conventionally keyed at their inner peripheries to a non-rotatable torque tube and the rotor discs are keyed at their outer peripheries to the associated aircraft wheel. Thus it is necessary for the torque-transmitting portions of the stators to extend radially inwardly beyond the inner peripheries of the rotors and for the torque-transmitting portions of the rotors to extend radially outwardly beyond the outer peripheries of the stators.

With the ever-increasing performance and carrying capacity of modern aircraft the demands imposed on aircraft wheel brakes are also continually increasing. In an attempt to meet this increased braking performance demand brake designers have found it necessary to turn to new friction materials which are capable of maintaining the required value of friction co-efficient at the high operating temperatures, of the order of 1000°C, now encountered in aircraft disc brakes.

One material currently in favor with aircraft disc brake designers, on account of its good frictional properties and high specific heat, is carbon, which, if the operating conditions demand, may be reinforced with filamentary carbon in the form of carbonized cloth or tape or the like or any other suitable reinforcement.

One of the problems associated with the use of carbon is that at the high operating temperatures now encountered in aircraft disc brakes any area of the carbon friction material which is exposed to the atmosphere tends to oxidize.

By virtue of the interleaved construction of a multi-plate disc brake it is the inner and outer peripheries of the brake discs which suffer the greatest exposure to the atmosphere. Thus any oxidation which occurs tends to take place in these exposed peripheral regions of the disc which also include the torque-transmitting keys or keyways.

It is thus desirable to eliminate or reduce to an acceptable level the oxidation of these peripheral torque-transmitting regions in order for the discs to have an acceptable operating life.

It is an object of the present invention to provide a multi-plate disc brake which alleviates the above problem of oxidation.

According to the present invention a multi-plate wheel disc brake comprises a disc pack comprising a number of annular stator discs axially slidably mounted at their inner peripheries on a non-rotatable torque-taking structure and interleaved with a number of rotor discs axially slidably mounted at their outer peripheries on the associated wheel, the rotor and stator discs being of a highly oxidizable, heat absorptive material, the inner peripheral torque-transmitting portions of the stator discs being arranged to extend radially inwardly beyond the inner peripheries of the rotor discs and the outer peripheral torque-transmitting portions of the rotors being arranged to extend radially outwardly beyond the outer peripheries of the stator discs, a brake-applying mechanism arranged axially to displace the discs into frictional engagement, and a number of filler pieces disposed in and occupying most of the free spaces within the disc pack between the radially projecting torque-transmitting portions of alternate discs.

Several embodiments of the present invention will now be described by way of example with reference to FIGS. 1 to 9 of the accompanying drawings in which:

FIG. 1 shows a half radial section through an aircraft multi-plate wheel disc brake in accordance with the present invention.

Figure 1:
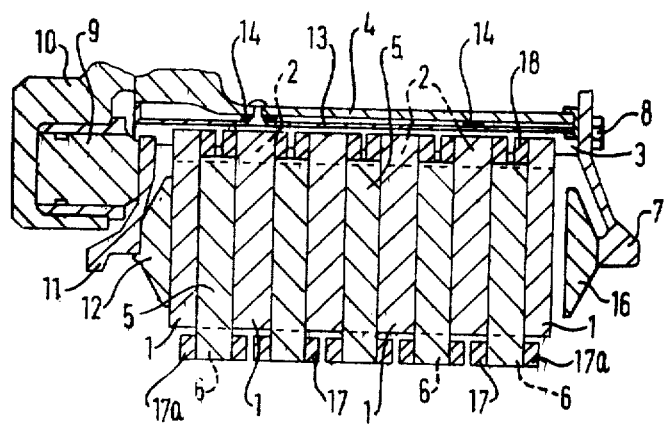
FIG. 1 is a radial half section through an aircraft disc brake provided with filler pieces in the spaces between the keys of the torque tube and the keys of the wheel in accordance with the invention.

The brake basically comprises a disc pack comprising a number of annular carbon stator discs 1 reinforced with laminations of carbonized cloth and interleaved between a number of annular carbon rotor discs 5 which are also similarly reinforced. The inner peripheries of the stators are arranged to extend radially inwardly beyond the inner peripheries of the rotors and are provided with a number of circumferentially-spaced torque-transmitting keyways 2 which slidably engage corresponding circumferentially-spaced keys 3 formed on a non-rotatable torque tube 4.

The outer peripheries of the rotors are conversely arranged to extend radially outwardly beyond the outer peripheries of the stators and are provided with a number of circumferentially-spaced torque-transmitting keyways 6 which slidably engage corresponding circumferentially-spaced metal keys (not shown) provided on the associated wheel.

A reaction flange 7, which supports a reaction ring 16, is secured to the axially outer end of torque tube 4 by bolts 8 and a number of circumferentially-spaced hydraulic brake-applying piston and cylinder assemblies 9 are provided in a hub assembly 10 which supports torque tube 4. The axial brake-applying thrust from the piston and cylinder assemblies is transmitted to the adjacent stator discs, and hence to the remaining rotors and stators, via thrust transmitting rings 11 and 12 which equalize the thrust in the circumferential direction in the manner described in U.S. Pat. No. 3,653,472.

As described in the assignees' co-pending U.S. Application Ser. No. 425,844, filed Dec. 18, 1973, in order to reduce the heat transfer from the stators to the torque tube and hence to the rest of the brake, the inner peripheries of the stators between the keyways are spaced from the torque tube and sheet metal heat shields 13 are provided on the torque tube between the keys. The heat shields are spaced from the torque tube by mounts 14 of heat insulating material. Additional heat insulating material (not shown) can be provided between the heat shields and the torque tube if required.

In accordance with the present invention the brake is also provided with two series of circumferentially-spaced filler pieces 17 and 18 disposed in the free spaces adjacent the outer and inner peripheries of the disc pack between the radially outwardly or inwardly projecting torque-transmitting portions of alternate discs. Radially outer filler pieces 17 are disposed in circumferentially-spaced positions between the rotor mounting keys (not shown) intermediate the torque-transmitting outer peripheral portions of the rotors which project radially outwardly beyond the stators, while inner filler pieces 18 are disposed between the stator mounting keys 3 intermediate the torque-transmitting inner peripheral portions of the stators which project radially inwardly beyond the rotors.

These filler pieces reduce to relatively small volume the free spaces within the disc pack adjacent the peripheries of the discs which would otherwise be occupied by air, thus reducing the rate of oxidation of the discs in the vicinituy vicinity the torque-transmitting keyways.

In the construction shown in FIG. 1 the filler pieces extending adjacent the inner periphery of each rotor and the outer periphery of all but the outermost stators are arranged in axially aligned pairs and are bonded, pegged or otherwise secured to the rotors and stators intermediate the mounting keys. The outer faces of the two outermost rotors are provided with filler pieces 17a in order to standardise the rotor constructions and avoid the necessity for special outer rotors with filler pieces only on their inner sides.

Figure 2:
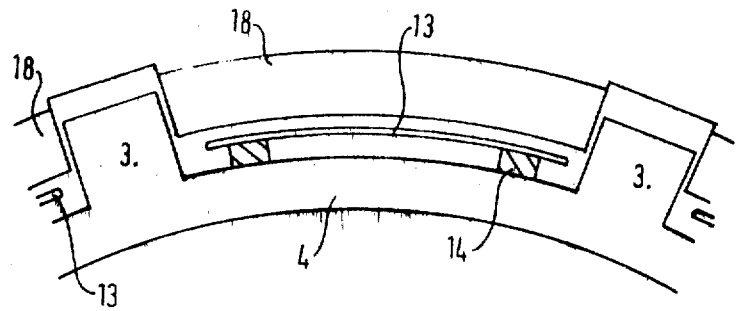
FIG. 2 is a cross-sectional view of the brake of FIG. 1.

When using the kind of arrangement, shown in FIGS. 1 and 2, in which the filler pieces are arranged in axially aligned pairs the total thickness of each pair of filler pieces must be such that the pairs of filler pieces will not contact each other when the brake is applied until the discs have worn down to their designed limit of thickness. Alternatively the filler pieces must be made from a crushable material which is progressively reduced in thickness as the discs wear down.

If desired the filler pieces can be arranged to become part of the heat sink of the brake and assist in dissipation of the heat from those parts of the discs which are particularly susceptible to oxidation by being formed from a high heat capacity material such as for example scrap reinforced carbon disc material or alternatively from any other suitable material such as high density unreinforced graphite.

When made from carbon the filler pieces can either be arranged to resist oxidation, and thus last the full life of the discs by being formed, for example, from a high density carbon, or alternatively they can be arranged to be sacrificial components which are made, for example, from low density carbon and which are intended to be replaced at least once during the life of the discs.

Alternatively, the filler pieces can be arranged to protect the remainder of the brake from the heat generated in the disc pack by being formed from a heat insulating material such as an asbestos or ceramic-based heat insulator.

Figure 3:
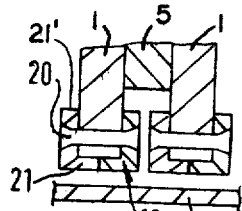
FIG. 3 is a detail view similar to FIG. 1 illustrating a modification of the invention.
Figure 4:
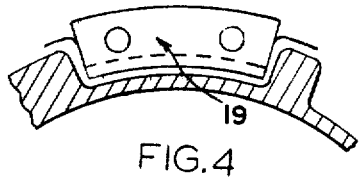
FIG. 4 is a cross-section view of the modification of FIG. 3, showing a filler piece between two keys on a torque tube.

In place of the simple block-type filler pieces described above each filler piece 19 (see FIGS. 3 and 4) may be L-shaped in cross-section, one arm 21' of each filler piece extending adjacent a frictionally engaging face of the associated disc intermediate two circumferentially adjacent keyways of the disc and the other arm 21 of the filler piece extending partway across the adjacent periphery of the associated disc also intermediate the said keyways. In this way the arm 21 of each of the filler pieces located in circumferentially spaced relation around the inner periphery of each stator disc is disposed between the latter and the torque tube intermediate the keys thereof. When this construction is employed two such filler pieces can be secured one to each side of the disc by bonding, pegging or any other suitable means, as shown in FIGS. 3 and 4, so as to cover and hence protect the associated peripheries of the discs between the keys against oxidation.

Figure 6:
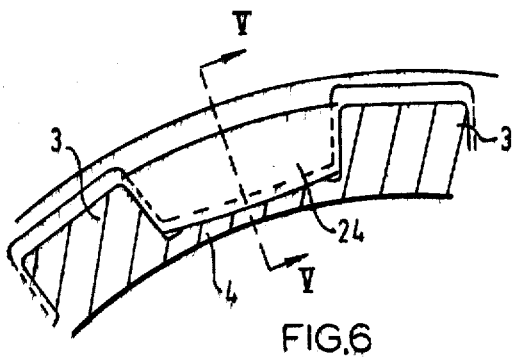
FIGS. 5 and 6 are views respectively similar to FIGS. 3 and 4 illustrating another modification.
Figures 5, 7:
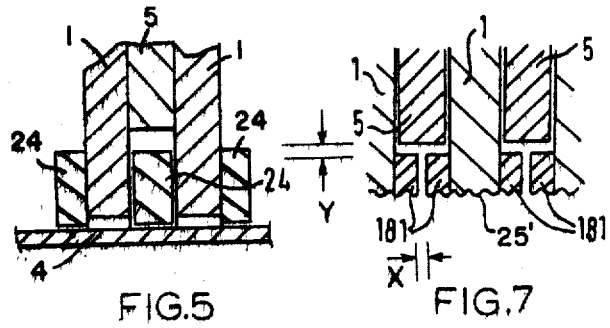
FIGS. 7 and 8 are views respectively similar to FIGS. 3 and 4 illustrating another modification.

In FIGS. 5 and 6 the two filler pieces between each adjacent pair of rotors or stators as shown in FIGS. 1 and 2 are replaced by a single block 24 located in each of the circumferentially separated spaces between the torque tube keys. It will be appreciated by those skilled in the art that the filler pieces 24 do not need to be secured to the discs and can merely be disposed between the keys on the torque tube and wheel, as shown in FIGS. 5 and 6.

Figure 8:
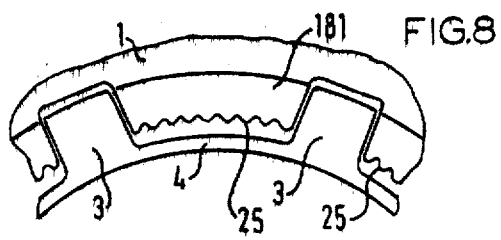

As shown in FIG. 7 to facilitate air cooling of the disc pack, so that the temperature will be reduced as rapidly as possible thereby minimizing oxidation, the radially inner ends of the torque-receiving portions of the stators 1 between the keyways 2 thereof as well as the radially inner peripheries of the filler pieces 181 secured thereto may be formed with circumferential flutings 25'. Alternatively, or in addition, the radially inner periphery of each stator 1 and radially inner periphery of each filler 181 secured thereto may be formed with axial flutings 25 as shown in FIG. 8. These flutings are designed to increase the surface areas exposed to air of the disc peripheries and/or fillers to promote heat exchange.

Figure 9:
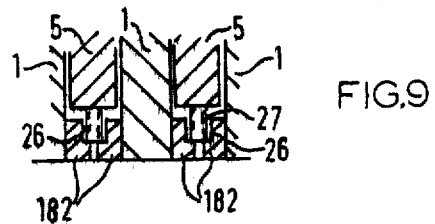
FIG. 9 is a view similar to FIGS. 3, 5 or 7 illustrating yet another modification.

In FIG. 9 there is shown an arrangement in which L-section filler pieces 182 are secured to the friction surfaces of the stators 1 adjacent their inner peripheries so that larger leg portions of the filler pieces are parallel to the friction surfaces and the shorter leg portions of the filler pieces 182 extend toward one another across the gaps between adjacent stators 1. Each adjacent pair of filler pieces 182 thus presents toward the inner periphery of the rotor 5 therebetween a pair of rebates 26, together forming an open-bottomed groove in which a filler piece 27 is located. A filler piece 27 is loosely located between each opposed pair of filler pieces 182 and forms with the associated filler pieces 182 an air seal preventing access of air between the disc pack and torque tube to the inner periphery of the rotor 5.

The filler pieces 27 are preferably of a greatly more crushable material than the filler pieces 182 to permit movement toward one another of adjacent pairs of the filler pieces 182 as the discs 1 and 5 wear down.

In all the non-crushable filler piece constructions described above the dimensions of the filler pieces should be chosen so that they occupy the maximum possible free space within the brake but at the same time allow the brake to be properly applied throughout the design wear life of the discs and also allow free thermal expansion of the filler pieces and associated keys and discs to take place. These requirements can be met in the construction shown in FIGS. 7 and 8, for example, by ensuring that the thickness X of the filler pieces allows the discs to wear down to their design limit thickness before the filler pieces are contacted on both faces by the discs and by arranging that the radial clearance Y between each filler piece and the adjacent disc is sufficient to allow for thermal expansion of the filler pieces and discs and also to allow for relative lateral movement between rotors and stators due to wheel deflection.

Experience has shown that during the operation of an aircraft multi-plate disc brake the inner periphery of the disc pack becomes the hottest part of the brake.

As the outer peripheral area of the disc pack exposed to the cooling effects of the atmosphere is considerably greater than the exposed inner peripheral area and, by virtue of the design of the brake, the cooling effects of the atmosphere experienced at the outer periphery of the pack are considerably greater than those experienced at the inner periphery, the rate of heat dissipation from the outer periphery of the disc pack is considerably greater than the rate of heat dissipation from the inner periphery of the pack. Thus the inner periphery of the pack not only reaches a higher temperature than the remainder of the brake but also retains the braking heat for a longer period than the remainder of the brake and is thus in a condition susceptible to oxidation for a longer period.

Thus, if desired, the various filler piece arrangements described above can be employed only adjacent the inner periphery of the disc pack in order to releave the problem of oxidation in this region without incurring the extra weight and expense of providing filler pieces adjacent the less susceptible outer periphery of the disc pack.

Alternatively, the filler piece arrangements can be used at the outer periphery of the disc pack only in order, for example, to protect the wheel from the heat generated in the brake in addition to reducing oxidation at the outer periphery of the disc pack.

Having now described my invention - what I claim is:

1. A multi-plate wheel disc brake comprising a disc pack comprising a plurality of interleaved annular rotor and stator discs each of substantially constant thickness throughout its radial cross section and each of a highly oxidizable, heat absorptive carbon material, the rotor discs having annular peripheral torque-taking portions which are keyed to key means rotatable with the wheel for rotation therewith and which extend radially beyond the stator discs so that free spaces exist between the torque-taking portions of each adjacent pair of rotor discs, the stator disc therebetween and the key means, the stator discs having inner peripheral torque-taking portions which are keyed to a non-rotatable torque tube which extends radially inwardly of the rotor discs so that free spaces exist between said torque-taking portions of each adjacent pair of stator discs, the rotor discs therebetween and the torque tube, said stator and rotor discs being axially slidable but non-rotatable relative to the torque tube and wheel, respectively, thrust applying means arranged at one end of the disc pack and reaction means at the other end of the disc pack said thrust applying means being actuable to displace the stator and rotor discs into frictional engagement to engage the brake, wherein oxidation retarding carbon filler pieces formed separately from the brake discs are located in circumferentially spaced relation between circumferentially adjacent pairs of torque tube keys in the free spaces between the torque-taking portions of adjacent pairs of stator discs, said filler pieces being shaped and arranged to lie between the torque tube keys and occupy at least the greater part of said free spaces between the rotor discs and the torque-tube.

2. A brake as claimed in claim 1, wherein two filler pieces are located in each said free space in mutually opposed relation, each being secured to the torque-taking portion of a respective one of the adjacent pair of stators defining said space, the extent of each filler piece axially of the associated disc being such that a gap is provided between said two filler pieces which is not less than the designed limit of axial thickness wear of the rotor between said two stators.

3. A brake as claimed in claim 2, wherein each of said two filler pieces is formed with a rebate and wherein an arcuate element of a material more crushable than the filler pieces is located adjacent the inner periphery of the rotor disc between said two stator discs and is received in the rebate of each filler piece.

4. A brake as claimed in claim 1, wherein each filler piece is a single arcuate segment of less wear resistance than the material of the discs and loosely located in each said free space so as substantially to fill the same.

5. A multi-plate wheel disc comprising a disc pack comprising a plurality of interleaved annular rotor and stator discs each of substantially constant thickness throughout its radial cross section and each of a highly oxidizable, heat absorptive carbon material, the rotor discs having outer peripheral torque-taking portions which are keyed to key means rotatable with the wheel for rotation therewith and which extend radially beyond the stator discs so that free spaces exist between the torque-taking portions of each adjacent pair of rotor discs, the stator disc therebetween and the key means, the stator discs having inner peripheral torque-taking portions which are keyed to a nonrotatable torque tube and which extend radially inwardly of the rotor discs so that free spaces exist between said torque-taking portions of each adjacent pair of stator discs, the rotor disc therebetween and the torque tube, said stator and rotor discs being axially slidable but nonrotatable relative to the torque tube and wheel, respectively, thrust applying means arranged at one end of the disc pack and reaction means at the other end of the disc pack, said thrust-applying means being actuable to displace the stator and rotor discs into frictional engagement to engage the brake, wherein channel shaped oxidation retarding carbon filler pieces straddle the radially inner periphery of each stator disc in circumferentially spaced relation between circumferentially adjacent pairs of keyways thereof, opposed wall portions of the filler pieces on adjacent pairs of stator discs occupying at least the greater part of the said free spaces between the torque-taking portions of adjacent pairs of stator discs and between circumferentially adjacent pairs of torque tube keys.

6. A brake as claimed in claim 5, wherein each filler piece is rivetted to the associated stator disc by at least one rivet passing axially through the torque-taking portion of the disc and having head portions which respectively engage the wall portions of the filler piece.

7. A brake as claimed in claim 1, wherein second, similar filler pieces are located in the free spaces between the torque-taking portions of adjacent pair of rotor discs, said second filler pieces being shaped and arranged to occupy at least the greater part of said free spaces between the rotor discs.

8. A brake as claimed in claim 5, wherein second, similar channel-shaped filler pieces straddle the outer periphery of said rotor discs between circumferentially adjacent pairs of keys thereof, opposed wall portions of the second filler pieces on adjacent pairs of rotor discs occupying at least the greater part of the said free spaces between the torque taking portions of said rotor discs.

* * * * *